(12) United States Patent
Gutierrez

(10) Patent No.: US 6,536,112 B1
(45) Date of Patent: Mar. 25, 2003

(54) PROCESS FOR MAKING JEWELRY INCORPORATING A MICROCHIP

(76) Inventor: Sergio Gutierrez, 5401 Collins Ave., No. 616, Miami Beach, FL (US) 33140

(*) Notice: Subject to any disclaimer, the term of this patent is extended or adjusted under 35 U.S.C. 154(b) by 0 days.

(21) Appl. No.: 09/808,546

(22) Filed: Mar. 13, 2001

(51) Int. Cl.[7] .............................................. A44C 27/00
(52) U.S. Cl. ................ 29/896.41; 29/896.4; 428/542.2; 63/1.12; 63/26; 63/33
(58) Field of Search ........................... 29/896.4, 896.41, 29/426.1; 451/28, 41; 428/542.2, 542.4; 63/33, 26, 1.12

(56) References Cited

U.S. PATENT DOCUMENTS

| 4,604,329 A | * | 8/1986 | Reber |
| 5,286,673 A | * | 2/1994 | Nishihara |
| 6,222,131 B1 | * | 4/2001 | Schilson |

* cited by examiner

Primary Examiner—P. W. Echols
(74) Attorney, Agent, or Firm—Malloy & Malloy, P.A.

(57) ABSTRACT

The present invention relates to a process for making a decorative device to be incorporated in jewelry or other objects that will likely be worn or carried by a person. The invention generally comprises the steps of removing a computer chip from a personal computer or other type of computing device and then removing from the computer chip substantially all of the metal connector elements used to mount the chip to a board, usually known as the "mother board." Next, at least one of the two main faces of the computer chip, typically made of silicon or a graphite material, is grinded down so as to expose a plurality of the conductive pathways formed within the computer chip, whereupon the main face of the computer chip with the pathways exposed thereon may be polished. Next, the computer chip is preferably mounted to a base, with the polished main face thereof being exposed for viewing and a solder is then applied about a perimeter of the exposed main face of the chip so as to decorate the side edges of the computer chip and secure it to the base. At this point, the decorative device comprised of the modified computer chip and base can be used to form a piece of jewelry or other decorative piece. For example, a decorative connecting band can be soldered or otherwise attached to opposite ends of the base so as to form a necklace, bracelet, anklet, belt, etc. Alternatively, the decorative device can be connected to a clip so as to form a barrette or secured to another object, such as a purse, wallet, key chain, picture frame, candle holder, lamp base, crucifix, etc.

28 Claims, 2 Drawing Sheets

PROCESS FOR MAKING JEWELRY INCORPORATING A MICROCHIP

BACKGROUND OF THE INVENTION

1. Field of the Invention

The present invention relates to a decorative device utilizing a micro computer chip modified in a novel and unique manner as well as to a process for making the decorative device. The decorative device of the present invention can be incorporated into various pieces of jewelry and/or other decorative objects.

2. Description of the Related Art

For centuries, and continuing in contemporary times, people have turned to jewelry such as necklaces, bracelets, earrings, brooches and the like to decorate their clothes and personal attire. Historically, jewelry has involved precious and semi-precious stones and metals such as diamonds, emeralds, gold, silver and the like. Of course, some have endeavored to create jewelry pieces using other metals, like platinum, stainless steel, iron and aluminum. Usually, however, the gems and metals used to make jewelry pieces have been naturally occurring, and this would include the use of pearls.

Major changes have taken place in society, however, in the last century or so which have revolutionized peoples' lives, such as the invention and wide spread use of electricity, automobiles and airplanes. More recently, however, society has begun to undergo another revolution that is primarily due to tremendous improvements in technology and communication. The keystone of this latest revolution is the discovery and use of semi-conductor or computer chips, which have made personal computers and a myriad of other devices commonplace. As just a few examples, the days of typing and re-typing documents with a manual typewriter are gone, as are the days of adding columns of numbers by hand.

Despite these enormous changes taking place in society, however, the appearance of jewelry and the gems or metals which are used in making jewelry, have for the most part, remained the same. As such, there is a need for jewelry and other decorative pieces to be updated so as to reflect the historic revolution now underway.

SUMMARY OF THE INVENTION

The present invention is intended to address these and other needs which exist in the field of art relating to jewelry. As such, the present invention primarily relates to a process for making a decorative device to be incorporated into jewelry and/or other decorative pieces that will likely be, but do not have to be, worn or carried by a person. More in particular, the present invention generally comprises the steps of removing a computer chip from a personal computer or other type of computing device and then, grinding down at least one of the two main faces of the computer chip, typically made of silicon or a graphite material, so as to expose a plurality of the conductive pathways formed within the computer chip. It is preferable that substantially all of the metal connector elements used to mount the computer chip to a board found within a personal computer, known as the "mother board" be removed as well. Thereafter, the main face of the computer chip with the pathways exposed thereon is preferably polished. Next, the computer chip is mounted to a base with the polished main face thereof being exposed for viewing, whereupon a solder can be applied about a perimeter of the exposed main face of the chip so as to secure the chip to the base and/or decorate the side edges of the computer chip. At this point, the decorative device comprised of a computer chip secured to a decorative base can be used to form a piece of jewelry or other decorative piece. For example, the decorative device can be used as a focal point of a necklace, bracelet, belt, etc. Alternatively, the decorative device can be attached to a clip so as to form a barrette or secured to another object, such as a purse, wallet, key chain, picture frame, candle holder, lamp base, crucifix, etc.

In alternative embodiments, the decorative device can include a gem connected to the computer chip's exposed main face or an application of solder thereto in order to offer more sparkle, height and/or a more three-dimensional appearance at that region of the chip. In another embodiment, the decorative device could be made to have a more industrial appearance, such as by not removing the computer chip from the mother board, but instead, cutting a portion of that board away, namely, that portion which has a computer chip secured thereto, and then taking the step of exposing a plurality of the conductive pathways formed within the chip and using the resulting decorative device in a piece of jewelry or other object.

These and other features of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4-C is a top view of an alternative base sized and shaped to receive a micro chip such as that shown in FIG. 3-B.

FIG. 5-C is also a top view of a micro chip such as that shown in FIGS. 3-A to 3-C mounted on a base but having a gem secured to one of the main faces of the micro chip exposed for viewing.

Like reference numerals refer to like parts throughout the several views of the drawings.

DETAILED DESCRIPTION OF THE PREFERRED EMBODIMENT

Figure 1:
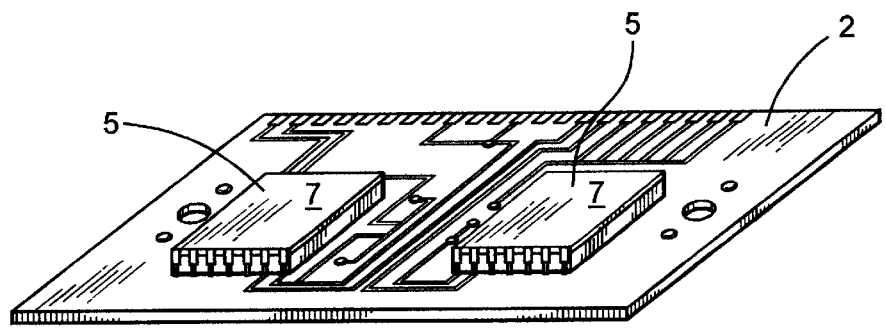
FIG. 1 is a perspective view of a section of a board taken from a personal computing device and having at least one semi-conductor or micro computer chip operably attached thereto.

While the present invention is susceptible of embodiment in many different forms, there is shown in the drawings and will herein be described in detail at least one specific embodiment, with the understanding that the present disclosure is to be considered as an exemplification of the principles of the invention and is not intended to limit the invention to the embodiment illustrated.

With reference now to the various drawings, the present invention relates primarily to jewelry used to adorn a person or his/her attire, but can also be used in connection with other decorative objects. In one embodiment, the present invention relates to a method for producing a decorative device which can be incorporated into a number of different types of jewelry items, whereas in another embodiment, the invention relates to the decorative device itself. In all of the embodiments, the goal is primarily to provide a decorative device which offers an updated and noteworthy appearance which reflects the historic revolution now underway involving technology and communication.

Figure 3A:
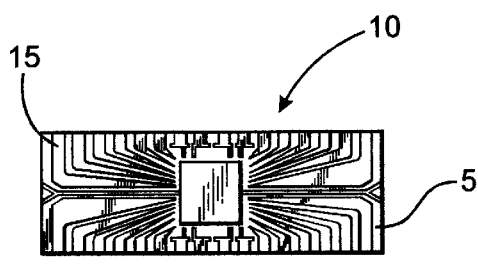
FIGS. 3-A, 3-B and 3-C are top views of a main exposed surface of various sized and/or shaped micro computer chips from which substantially all of the metal connector elements used to mount the chip to a board have been removed, and further, with the main face having been grinded down so as to expose a plurality of the conductive pathways formed within the computer chip.
Figure 3B:
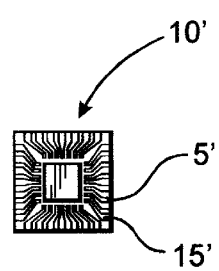
Figure 3C:
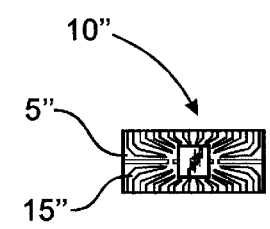
Figure 5A:
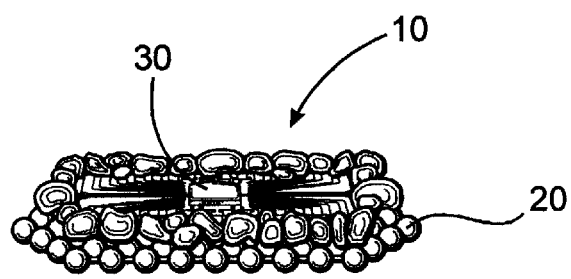
FIG. 5-A is a perspective view and FIG. 5-B is a top view of a micro chip such as are shown in FIGS. 3-A to 3-C mounted on a base such as that shown in FIG. 4 with one of the main faces of the micro chip exposed for viewing and with a solder having been applied to a central portion thereof and about a periphery of the base and micro computer chip.
Figure 5B:
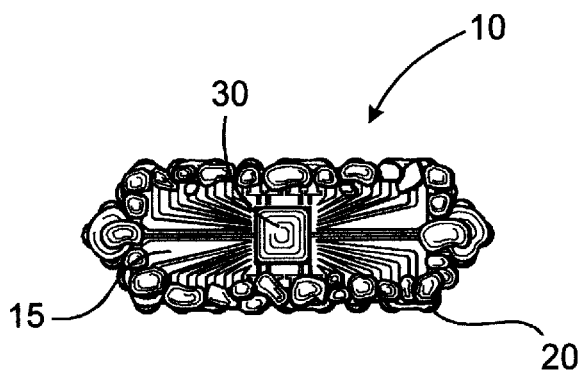
Figure 5C:
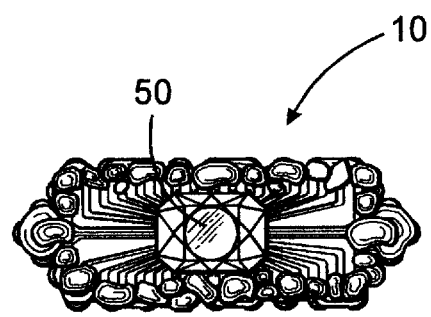

More in particular, and as shown in FIGS. 3-A to 3-C and in FIGS. 5-A and 5-B, the present invention comprises a decorative device which is generally indicated by reference numeral 10. The decorative device 10 comprises a semiconductor chip or micro-computer chip 5 which has preferably been prepared in accordance with the method of the present invention, as will now be described.

Figure 2:
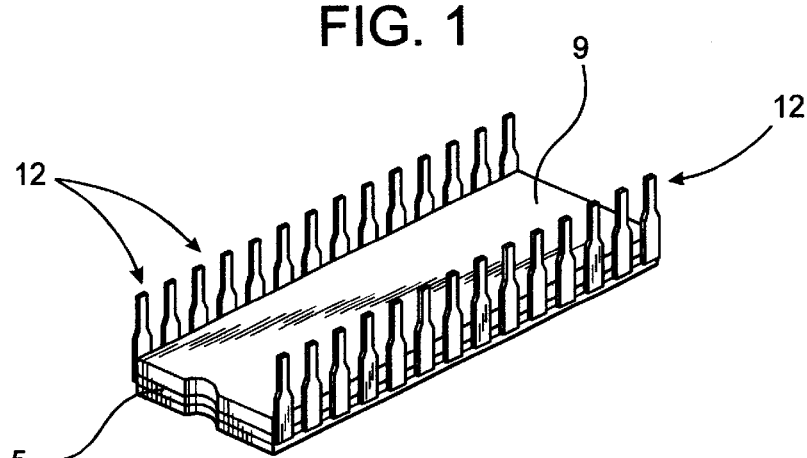
FIG. 2 is a perspective view of a micro computer chip that has been removed from the board of a personal computing device with the metal connector elements used to operably attach the chip to the board being illustrated.

By way of background, and as is generally known in the art, personal computers and other types of computing devices rely, among other things, primarily upon at least one semi conductor chip or micro computer chip for operation. As illustrated in FIG. 1, the semi conductor chip or micro computer chips 5 are operably attached to a board 2, typically referred to as a "mother board," electrically connected with other components thereon, and electrically interconnected with other parts of the computer to allow for operation of the computer. Each micro computer chip typically has two main faces, namely, a first exposed face or surface 7, shown in FIG. 1, and a second face or undersurface, 9, shown in FIG. 2, which confronts the mother board. Typically, micro computer chips are formed of silicon, a silicon blended material, or a graphite material and perhaps more importantly, have a number of conductive pathways 15 formed therein which are encapsulated within the silicon or other material so as to not be readily visible to the human eye. Also, micro computer chips 5 are typically attached to the mother board, shown in FIG. 1, by a number of metal connector elements or legs 12, as shown in FIG. 2.

According to the method of the present invention, a preferred decorative device 10 can be achieved by generally following several steps. First, a computer chip such as one of those indicated by reference number 5 in FIG. 1 is removed from the mother board 2 of a personal computer or other type of computing device. In a preferred embodiment, a next step would include removing substantially all of the metal connector elements or legs 12 from the computer chip 5, although this step could be omitted. Next, the silicon or other material used in forming the chip is ground down or sanded away from at least one of the two main faces of the computer chip, such as but not necessarily limited to undersurface 9, so as to expose a plurality of the conductive pathways formed within the computer chip 5. To accomplish this, a hand-held type of rotary tool having a grinding or sharpening head attached thereto can be used, which are known in the art for other purposes. Preferably, the main face 9 of the computer chip 5 with the pathways exposed thereon is then polished. In addition, or as an alternative to polishing, the exposed surface 9 of the computer chip 5 can be varnished. The result will be a decorative device 10 that can be worn either alone or in combination with other elements as a piece of jewelry or use as another type of decorative object.

Figures 4A, 4B, 4C:
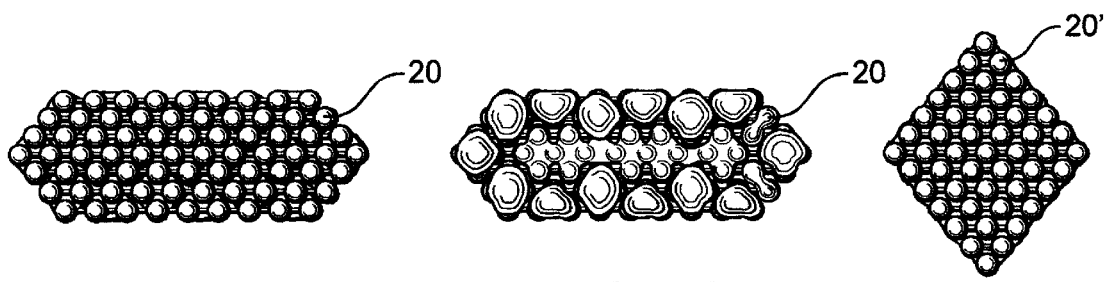
FIGS. 4-A and 4-B are respectively, a bottom view and a top view of a base correspondingly sized and shaped to receive a micro chip such as that shown in FIG. 3-C thereon.
Figure 6:
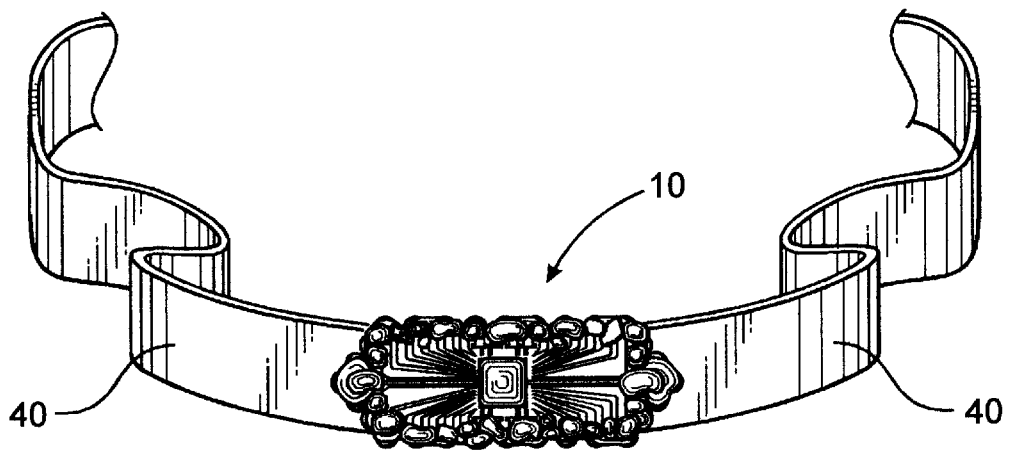
FIG. 6 is a perspective view of the invention illustrated in FIG. 5-B operably connected to a decorative band so as to form a piece of jewelry, such as a necklace or bracelet, or other decorative object.

Referring now to FIGS. 4-A through 5-B, in more preferred embodiments, the decorative device 10 will be further modified to include additional structural features. For example, the decorative device 10 comprising computer chip 5 can be mounted to a base 20 and/or 20' as shown in FIGS. 4-A, 4-B and 4-C. Ideally, the computer chip 5 will be mounted on the base 20, such as to a top surface as shown in FIG. 4-B, with the polished main face thereof and pathways 15 being exposed for viewing. In the drawings, the base 20 or 20' is shown in a ball and chain arrangement although other decorative arrangements for a base could easily be utilized. While the decorative device 10 could be adhesively mounted to the base 20, in more preferred embodiments, a solder is applied about a perimeter of the exposed main face of the computer chip and the base so as to decorate the side edges of the computer chip and secure it to the base 20. The solder is preferably formed from metals, such as silver, lead, tin, antimony or other combination thereof, which are heated to a liquid or substantially liquid form and then applied to the decorative device 10 and allowed to cool. Alternatively, however, one or more other metals could be used to form the solder, such as but not limited to gold, platinum, stainless steel, other precious and/or semi-precious metals, etc. The solder is preferably also applied to the exposed main surface 9 of the computer chip 5, with the result that some of the solder will become secured to and provide a metal overlay on the conductive pathways 15. Ideally, an additional layer of solder will be applied to a central portion 30 of the computer chip 5, as shown in FIGS. 5-A, 5-B and 6, so as to provide a more three dimensional, convex or bubble like appearance thereon. At this point, the computer chip 5 and base 20 are in a more preferred form such that the resulting decorative device 10 can be used to form a piece of jewelry or to adorn another decorative object. For example, and as illustrated in FIG. 6, a decorative connecting band 40 can be soldered to opposite ends of the decorative device 10 so as to form a necklace, bracelet, anklet, belt, etc. Alternatively, the decorative device 10 can be attached to a clip so as to form a barrette or secured to another object, such as but not limited to, a purse, wallet, key chain, picture frame, lamp base, earrings, etc.

In an alternative embodiment, instead of applying an additional layer of solder to the central portion 30 of the computer chip 5, a gem 50 can be secured thereto so as to offer an appearance such as that shown in FIG. 5-C. For example, a gem such as a diamond, emerald, ruby, etc. could be adhered to the exposed main surface 9 of the computer chip 5 at the central region thereof, although it would probably be most prudent to drill a hole in the computer chip 5, insert the gem and affirmatively anchor the gem in the desired location thereon. Of course, differently sized gems, different types of gems, whether precious, semi-precious or otherwise, and/or more than one gem could be utilized in this regard. At this point, the resulting decorative device 10 can be used to form a piece of jewelry or to adorn another decorative object. Again, and with reference to FIG. 6, a decorative connecting band 40 could be secured to opposite ends of the decorative device 10 so as to form a necklace, bracelet, etc. or alternatively, the decorative device 10 could be utilized on or to form another type of decorative object, as recited previously, above.

In yet another embodiment, the decorative device 10 may be formed in a slightly different manner to offer a more industrial appearance. In particular, instead of removing the computer chip 5 from the mother board 2, the decorative device 10 could be formed by cutting or otherwise separating a portion of the mother board 2 which holds the computer chip 5 away from the remainder of the board 2. One or more of the steps recited previously may then be followed. For example, the silicon or other material used in forming the computer chip 5 can be ground down or sanded away from the main face 7 of the computer chip, so as to expose the conductive pathways formed therein. If desired, the main face 7 with the exposed conductive pathways 15 may then be polished and/or a solder may be applied either or both about the perimeter of the chip 5 and at a central region 30 thereof. At this point, the decorative device 10 comprising a portion of a mother board 2 and an attached computer chip 5 having a modified appearance can be used to form a piece of jewelry or other decorative object, as recited above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A process for making a decorative device comprising the steps of:
    a) removing substantially all of the metal connector elements from a computer chip used to mount said computer chip to a board; and
    b) exposing a plurality of conductive pathways formed within said computer chip.

2. A process as recited in claim 1 further comprising the step of incorporating the resulting decorative device into a piece of jewelry.

3. A process as recited in claim 1 further comprising the step of mounting the resulting decorative device onto a decorative object.

4. A process as recited in claim 1 further comprising the step of mounting a gem to said computer chip.

5. A process as recited in claim 4 further comprising the step of drilling into said computer chip to form at least a recess and mounting said gem within said recess.

6. A process as recited in claim 1 wherein said step of exposing conductive pathways formed within said computer chip comprises grinding at least one main face of said computer chip.

7. A process as recited in claim 6 further comprising the step of polishing at least said exposed face of said chip.

8. A process for making a decorative device comprising the steps of:
    a) taking a board of a computing device and removing a computer chip and portion of the board to which said computer chip is attached; and
    b) exposing a plurality of conductive pathways formed within said computer chip.

9. A process as recited in claim 8 further comprising the step of incorporating the resulting decorative device into a piece of jewelry.

10. A process as recited in claim 8 further comprising the step of mounting the resulting decorative device on a decorative object.

11. A process as recited in claim 8 wherein said step of exposing conductive pathways formed within said computer chip comprises filing a face of said computer chip.

12. A process as recited in claim 11 further comprising the step of cleaning at least said exposed face of said chip.

13. A process for making a decorative device to be worn on a person, carried by a person or by an object, the process comprising the steps of:
    a) removing substantially all of the metal connector elements from a computer chip used to mount said chip to a board;
    b) grinding at least one main face of said chip to expose a plurality of conductive pathways formed within said chip;
    c) polishing at least said exposed face of said chip;
    d) mounting said chip in a base; and
    f) using said chip in said base to form the decorative device.

14. A process as recited in claim 13 wherein said step of mounting said chip in a base comprises applying a solder to a perimeter of said exposed face of said chip and of said base.

15. A process as recited in claim 14 wherein said step of mounting said chip in a base comprises mounting said chip with said at least one exposed main faces exposed for viewing.

16. A process as recited in claim 14 further comprising the step of making said base with a metal and forming a ball and chain pattern.

17. A process as recited in claim 13 further comprising the step of applying solder to a central portion of said exposed main face of said computer chip.

18. A process as recited in claim 13 further comprising the step of applying solder to said exposed main face of said computer chip.

19. A process as recited in claim 13 further comprising the step of heating a metal taken from the group of silver or lead for making said solder.

20. A process for making jewelry comprising the steps of:
    a) removing a computer chip from a computing device;
    b) removing from said computer chip at least part of the metal connector elements used to secure said computer chip to a board;
    b) sanding a main face of said computer chip to expose a plurality of internal, electrically conductive pathways formed within said chip;
    c) applying at least one coat of varnish to said plurality of internal, electrically conductive pathways on said exposed main face;
    d) heating a metal and applying a solder of said heated metal about a substantial portion of a perimeter of said exposed main face of said computer chip;
    e) securing a second main face of said computer chip to a base; and
    f) forming a piece of jewelry with said computer chip and said base at a central location on the jewelry piece.

21. A process as recited in claim 20 further comprising the step of applying the solder to a central portion of said exposed main face of said computer chip.

22. A process as recited in claim 20 further comprising the step of applying the solder to said exposed main face of said computer chip.

23. A process as recited in claim 20 wherein said metal is heated to a liquid.

24. A process as recited in claim 20 wherein said metal is taken from the group of silver, lead or antimony.

25. A process as recited in claim 20 wherein said step of forming a piece of jewelry comprises the step of securing a decorative connecting band to opposite ends of said base so as to form a necklace with said base and said computer chip disposed at substantially a central region thereof.

26. A process as recited in claim 20 wherein said step of forming a piece of jewelry comprises the step of securing a decorative connecting band to opposite ends of said base so as to form a bracelet with said base and said computer chip disposed at substantially a central region thereof.

27. A process as recited in claim 20 wherein said step of forming a piece of jewelry comprises the step of securing said base to a decorative object.

28. A process for making a decorative device for being worn on or carried by a person comprising the steps of:
   a) removing substantially all of the metal connector elements from a computer chip used to mount said chip to a board;
   b) grinding at least one main face of said chip to expose a plurality of conductive pathways formed within said chip;
   c) polishing at least said exposed face of said chip;
   d) applying a solder to a perimeter of said exposed face of said chip; and
   e) mounting said chip on a decorative object.

* * * * *